United States Patent [19]
Gleason et al.

[11] 3,860,845
[45] Jan. 14, 1975

[54] LONG LIFE PROPORTIONAL COUNTER RADIATION DETECTOR

[75] Inventors: Charles H. Gleason; Allan J. Bamford; Wallace Gillies, all of Horseheads, N.Y.

[73] Assignee: Westinghouse Electric Corporation, Pittsburgh, Pa.

[22] Filed: June 27, 1973

[21] Appl. No.: 374,228

[52] U.S. Cl. .................................. 313/61 D, 313/1
[51] Int. Cl. ................................................ H01j 39/32
[58] Field of Search .................... 313/61 R, 61 D, 1

[56] References Cited
UNITED STATES PATENTS
3,702,409   11/1972   Goodings et al. ................ 313/61 D

*Primary Examiner*—Herman Karl Saalbach
*Assistant Examiner*—Darwin R. Hostetter
*Attorney, Agent, or Firm*—W. G. Sutcliffe

[57] ABSTRACT

A long life gas-filled proportional counter radiation detector is provided having a shielded gas reservoir interconnected with the prime detection chamber. The gas fill within the detection chamber is exposed to radiation but the reservoir gas is shielded to thereby minimize dissociation and absorption of the gas upon the chamber wall.

8 Claims, 3 Drawing Figures

PATENTED JAN 14 1975 3,860,845

LONG LIFE PROPORTIONAL COUNTER RADIATION DETECTOR

BACKGROUND OF THE INVENTION

The present invention relates to nuclear radiation detectors of the gas-filled proportional counter type. The gas-filled proportional counter type detector is well known in the art and generally comprises a cylindrical conductive chamber wall, a centralized electrode disposed within the chamber, a thin coating of neutron absorptive material on the interior of the chamber wall, and a fill gas. Such proportional counters are typically used in pulse operation, wherein a voltage is applied between the chamber wall and the central electrode with a current passing therebetween proportional to the ionization therein as a result of neutron absorption and emission from the neutron absorptive material. The fill gas used in such detectors typically comprises an inert gas such as argon, and a given percentage of a dissociable polyatomic or molecular gas such as carbon dioxide. The carbon dioxide is typically present in an amount of up to 25 volume percent of the total fill gas.

Exposure of the detector to high neutron flux levels can result in instability which is caused by dissociation of the carbon dioxide and subsequent absorption of the dissociation products upon the chamber wall. The dissociated oxygen can combine with the neutron absorptive material such as boron-10, on the wall of the detector and result in excessive multiplication at normal operating voltages. The molecular gas additive to the fill gas is important since it enhances the discharge transmission characteristics of the fill gas to permit reliable pulse operation.

SUMMARY OF THE INVENTION

A long life gas-filled proportional counter radiation detector comprises a discharge confining envelope having a high neutron cross-section neutron absorptive material deposited on the interior surface. A centralized conductive member is supported within the discharge confining envelope with at least one end of the conductive member being brought through the envelope. A fill gas is provided within the discharge confining envelope, at least a portion of which is a dissociable polyatomic or molecular gas which is dissociable upon exposure to radiation emitted by the neutron absorptive material. A fill gas reservoir is interconnected with the discharge confining envelope but substantially shielded therefrom, to prevent exposure of the fill gas within the reservoir to radiation emitted by the neutron absorptive material. The volume of the fill gas reservoir is preferably at least twice the volume of the discharge confining envelope to provide a ready reservoir of the molecular gas to thereby significantly improve the operational life of the detector device.

DESCRIPTION OF THE PREFERRED EMBODIMENT

Figure 1:
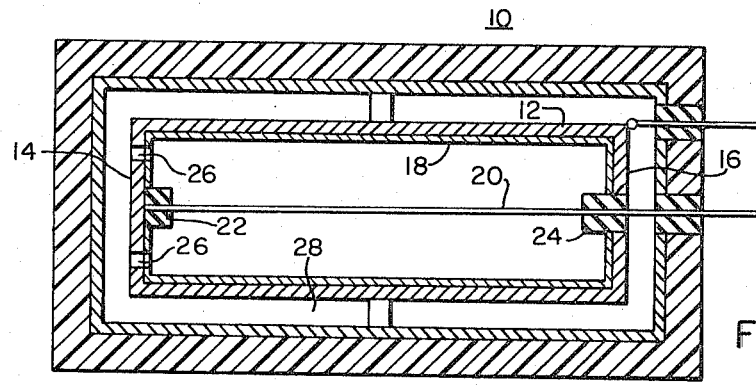
FIG. 1 is a sectional view in elevation of an embodiment of the present invention.

The present invention can be best understood by reference to the exemplary embodiments shown in the figures. The proportional counter neutron detector 10 comprises a discharge confining envelope 12 which is preferably cylindrical and has substantially closed end wall portions 14 and 16, respectively. The discharge confining envelope 12 is typically formed of aluminum or other such conductive metal and is by way of example about 60 mils thick. A thin layer of neutron absorptive boron-10 is provided on the interior wall of the envelope 12. The boron-10 has a high neutron cross-section, and is typically disposed in a thin layer which provides about one milligram of material per square centimeter of area. The boron-10 captures thermal neutrons and decays to lithium and alpha radiation. The alpha radiation causes dissociation of the carbon dioxide fill gas constituent. A centralized electrode 20 is disposed within the envelope 12 and typically comprises a tungsten wire which may range from 0.004 to 0.010 inch in diameter. The central electrode 20 is supported by high voltage insulator members 22 and 24 at either end. Insulator member 24 is a ceramic member which is continued in a ceramic to metal seal to permit a lead-in to central electrode 20 to be brought out through the conductive wall of envelope 12. Insulators 22 and 24 act as high voltage standoffs since the preferred mode of operation for this proportional counter is as a high voltage device. At least one aperture 26 and preferably a plurality of apertures 26, are provided through the wall of envelope 12. The aperture 26 is preferably provided through the end walls 14, 16 of envelope 12. A fill gas reservoir 28 is defined by sealed outer envelope 30 and the discharge confining inner envelope 12. The entire volume of the discharge confining inner envelope 12 and of the reservoir 28 contains a fill gas, typically argon and carbon dioxide at a fill gas pressure of about 20 Torr. The carbon dioxide is preferably present in an amount of about 5 volume percent. The fill gas pressure can be widely varied within a range of from about 2 to 200 Torr. The volume percent of carbn dioxide can also be widely varied.

A neutron moderator material 32 can be disposed on the exterior wall of the sealed outer envelope 30 for the purpose of thermalizing incident neutrons. The aperture or apertures 26 are sufficient to permit ready communication of the fill gas between the discharge chamber and the reservoir. Neutrons which pass through the reservoir and the envelope 12, are absorbed by the boron-10, which decays by emitting alpha and lithium particle radiation.

A portion of the carbon dioxide which is initially within the discharge confining area or chamber will be dissociated by the alpha radiation emitted therein, and a portion of the dissociated oxygen absorbed on the envelope wall. The carbon dioxide contained within the reservoir is undisturbed by the alpha radiation because the alpha radiation is absorbed by the aluminum envelope wall 12. The fill gas will equilibrate in the discharge confining area and the reservoir to provide a long life device. The volume ratio of the fill gas reservoir to the volume defined by the discharge confining inner envelope should be as great as possible within the dimensional constraints of the overall dimensions of the neutron detector. The reservoir volume preferably exceeds the discharge confining volume. The greater the ratio of reservoir volume to discharge confining volume the greater the improvement in operating lifetime for the device.

In the embodiment shown in the drawings, the fill gas reservoir is provided as a concentric volume about the discharge confining volume for space saving considerations. It is also possible to provide the fill gas reservoir at one end of the device so that it is still substantially shielded from the discharge confining area by the metallic wall of the envelope 12.

Figure 2:
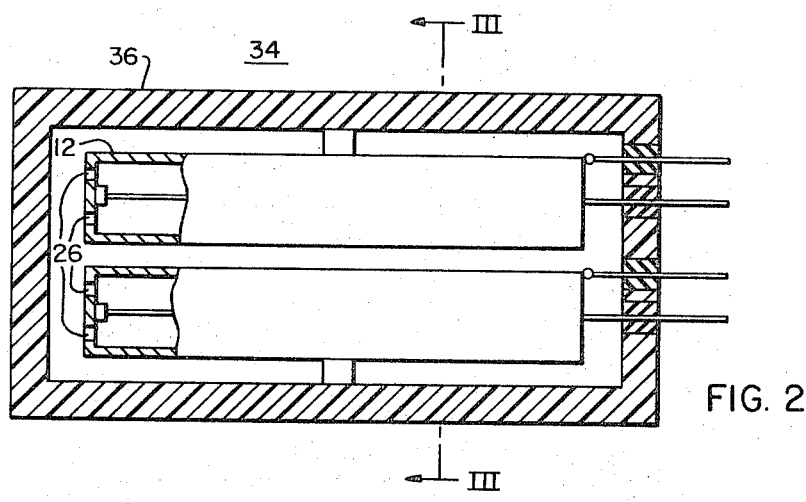
FIG. 2 is an elevational view in section of an alternative embodiment of the present invention.
Figure 3:
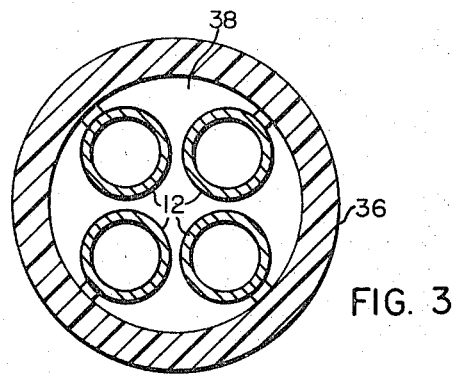
FIG. 3 is an end view of the embodiment seen in FIG. 2.

In the embodiment seen in FIGS. 2 and 3, a multi-element detector 34 is provided wherein a plurality of four discharge discharge confining inner envelopes 12, are provided within a sealed outer envelope 36. Again aperture 26 is provided through the end wall 14 of the envelopes 12, to permit ready communication between the reservoir 38 defined by the outer wall 36 and the inner envelopes 12. The structural details of the actual detectors are the same as described above with respect to FIG. 1. Again, a neutron moderator may be disposed about the exterior of the outer envelope 36.

Other neutron absorptive materials can be substituted for the boron-10, and other dissociable gases can be substituted for the carbon dioxide. The inert fill gas can also be varied. The device of the present invention permits long-lived pulse operation in which a sharp pulse is obtained to permit good resolution between a neutron event and normal background radiation.

What is claimed is:

1. A radiation detector comprising a discharge confining envelope having a neutron absorptive material deposited on the interior surface thereof, a centralized conductive member supported within said discharge confining envelope with at least one end of the conductive member brought through said envelope, a fill gas within said disharge confining envelope at least a portion of which is dissociable gas which is dissociable upon exposure to radiation emitted by the neutron-absorptive material, and a fill gas reservoir interconnected with the said discharge confining envelope but substantially shielded therefrom, to prevent exposure of the fill gas contained within the reservoir to radiation emitted by the neutron absorptive material.

2. The device specified in claim 1, wherein the fill gas reservoir is defined between a sealed outer envelope concentric about said discharge confining envelope.

3. The device specified in claim 1, wherein a plurality of discharge confining envelopes are disposed within a sealed outer envelope, with the fill gas reservoir defined between the sealed outer envelope and the plurality of discharge confining envelopes each of which communicates with the reservoir.

4. The device specified in claim 1, wherein the fill gas reservoir volume is preferably greater than the volume of the discharge confining envelope.

5. The device specified in claim 1, wherein the neutron absorptive material is boron deposited as a thin layer upon the conductive discharge confining envelope.

6. The device specified in claim 1, wherein the fill gas is a mixture of argon and carbon dioxide, with the carbon dioxide present in an amount of about 5 volume percent.

7. The device specified in claim 1, wherein the discharge confining envelope is a cylindrical proportional counter detector.

8. The device specified in claim 1, wherein a neutron moderator material is disposed about the fill gas reservoir.

* * * * *